United States Patent

Schwarz

[11] 4,223,924
[45] Sep. 23, 1980

[54] TUBE JOINT BETWEEN TWO INTERSECTING TUBES

[76] Inventor: Anton Schwarz, Höhenstrasse 24 a, A-6020 Innsbruck, Austria

[21] Appl. No.: 943,351

[22] Filed: Sep. 18, 1978

[51] Int. Cl.² .............................................. F16L 13/02
[52] U.S. Cl. .................................... 285/189; 165/173; 285/286
[58] Field of Search .................. 285/189, 286; 165/173

[56] References Cited

U.S. PATENT DOCUMENTS

| 1,368,770 | 2/1921 | True | 285/189 X |
| 3,941,409 | 3/1976 | Rameau | 285/189 X |
| 4,147,382 | 4/1979 | Wachter | 285/189 |

FOREIGN PATENT DOCUMENTS

| 1095599 | 12/1960 | Fed. Rep. of Germany | 285/189 |
| 2161307 | 7/1973 | France | 285/189 |
| 1029095 | 5/1966 | United Kingdom | 285/189 |

Primary Examiner—Thomas F. Callaghan
Attorney, Agent, or Firm—McGlew and Tuttle

[57] ABSTRACT

A tube joint between two intersecting tubes of a light metal radiator whose first tube has at least two ribs extending in longitudinal direction and projecting on both sides and whose second tube is a header transversally extending with respect to the ribs of said first tube, one end of said first tube forming a tight, communicating connection with an aperture in the header, if required by interpositioning a gasket, sleeve or the like. The tightness of said communicating connection is obtained by pressing said header against said tube and the compressive force is produced by welding said header to said ribs of said tube.

6 Claims, 4 Drawing Figures

TUBE JOINT BETWEEN TWO INTERSECTING TUBES

BACKGROUND OF THE INVENTION

1. Field of the Invention

The invention relates to a tube joint between two intersecting tubes of a radiator or the like, of a light metal radiator in particular, whose first tube has at least two ribs extending in longitudinal direction and projecting on both sides and whose second tube is a header transversally extending with respect to the ribs of said first tube, one end of said first tube forming a tight, communicating connection with an aperture in the header, if required by interpositioning a gasket, sleeve or the like.

2. Description of the Prior Art

Such radiators have frequently been used lately as they can be made of two types of extruded profiles. The material used for the extruded profiles is preferably an aluminium alloy. It is a problem with such radiators, however, to provide a liquid- and gastight connection between the individual radiator ribs containing the tubes for the heat exchanging medium and the header.

Suggestions have already been made to weld or to glue the tubes and headers directly with each other. Welding or gluing of the tubes envolves problems, however, as when in operation, particularly during heating up or cooling off the radiator, thermal stress and thermal expansion are caused by great thermal differences, which may impair the integrity of the connection after long periods of operation. Moreover, the welding of aluminium alloys already envolves difficulties. A connection between the tubes and headers of a radiator is known in the art in which the headers are pressed against the tubes by means of one or several screws and by interpositioning washers, the screws being supported in a thrust member which is fastened in the ribs of the tube. Disadvantages of this connection are the relatively high costs of mounting and the fact that a gradual loosening of the tension screw occurs.

It is a further characteristic problem of radiators made of light metal alloys that, when in operation, and particularly during heating up, jingling, crackling and clickling sounds and noises can be heard. Up to now they were attributed to the high and different thermal expansion within the radiator and considered as disadvantageous characteristic which could not be eliminated.

SUMMARY OF THE INVENTION

It is the object of the invention to provide for radiators a tube joint of the above-mentioned kind, which eliminates the above-described disadvantages, keeps the costs of production particularly low and ensures safe operation.

The invention is based on the fact that the undesirable noise during operation is mainly produced at the joints between the tubes and the header. This is due to the fact that the aforementioned clamped and screwed joints allow a slight displacement which causes vibrations of the ribs of the radiator or of the tubes.

The tube joint according to the invention provides that in the cross area the header is pressed against the tube and welded to the ribs of the tube.

The tube joint according to the invention has the advantage that in the joint area between the header and the tube tightness is obtained by compression, preferably by interpositioning washers or the like, whereas the required compressive force is produced by welding the header to the ribs of the tube. Thus, spot welding will be sufficient, whereby the welds are easily accessible. The welding spots can also be spaced from the actual joint of the two tubes so that gaskets or fitting areas, which may be provided, are not detrimentally deformed. Moreover, the surprising effect became apparent that the swinging and crackling noises during heating up and cooling off the radiator, which seemed unavoidable up to now, where practically completely eliminated by the stiffening and muffling effect of the welding spots.

It is of advantage to provide the header with radially projecting ridges in the cross area, to insert the ribs of the tube into radial indentations of the ridges and to weld the ridges of the header to the ribs of the tube.

It is, furthermore, of advantage if the header is pressed against the tube by means of stop zones and if the gasket disposed between the tube and the header is elastically or plastically deformed by a pre-set dimension.

BRIEF DESCRIPTION OF THE DRAWINGS

In the following the invention will be described in more detail by means of embodiments without being limited thereto.

DESCRIPTION OF THE PREFERRED EMBODIMENTS

Figure 1:
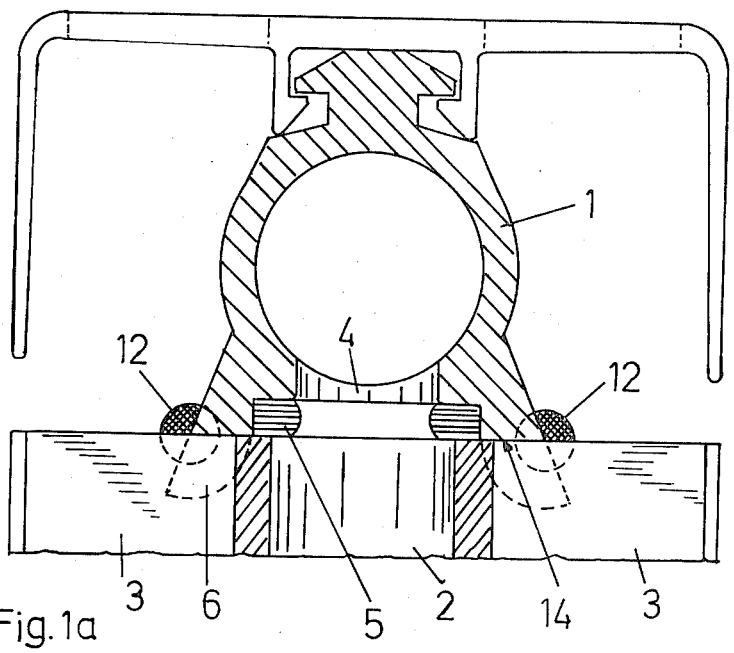
FIG. 1 shows a sectional view of the tube joint between the header and the tube.
Figure 1A:
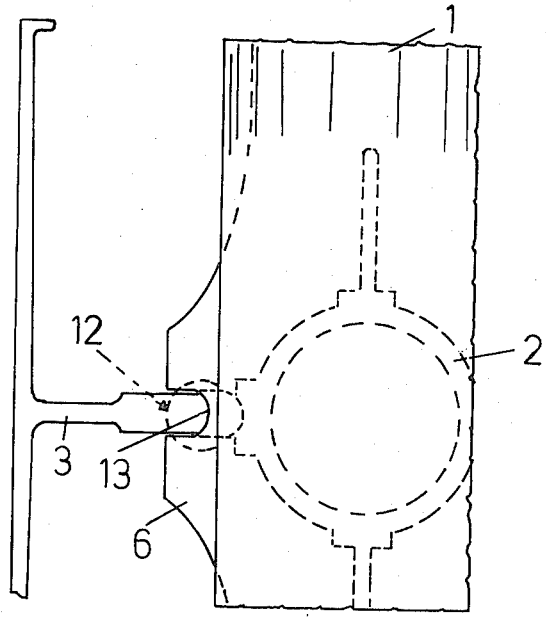
FIG. 1a shows a schematic top view of a part of the joint according to FIG. 1 immediately before welding.

FIGS. 1 and 1a show a section of a radiator made of extruded profiles in the cross area of the header and the tube.

The tube 2 has ribs 3 disposed transversally to the longitudinal extension of the header 1 and formed to be air conducting- and heat exchanging surfaces. The tube 2 communicates with the header 1 by means of an aperture 4. Moreover, the header 1 in the cross area with the tube 2, is provided with radially extending ridges 6 into which radial indentations 13 are recessed. The ribs 3 of the tube 2 are inserted into said indentations 13. The bottom surfaces 14 of the radial indentations are stops so that the joints between the header 1 and the tube 2 are spaced at a pre-set distance. In the area of this joint a washer 5 is disposed which is thus compressed to a pre-set dimension. During mounting the washer 5 can thus not be damaged. The header 1 pressed against the tube 2 in the above-described manner is in the area of the radial indentations 13 of its radially projecting ridges 6 connected with the ribs 3 by means of welding spots 12.

Figure 2:
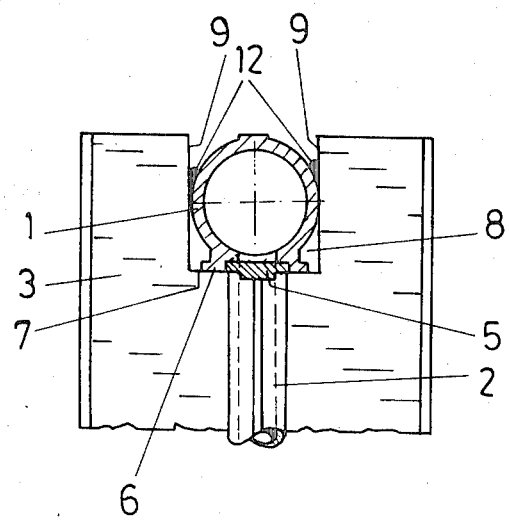
FIG. 2 shows a partial view, in section, of a further tube joint.

In an embodiment according to FIG. 2 the tube 2 ends at a distance below the end portions of its ribs 3. The header 1 engages in the thus formed recesses 8 and is connected with the lateral edges 9 of the ribs 3 by means of wedge-shaped welding spots. At the joint between the aperture in the header 1 and the end of the tube 2 a washer 5 is provided, too.

Figure 3:
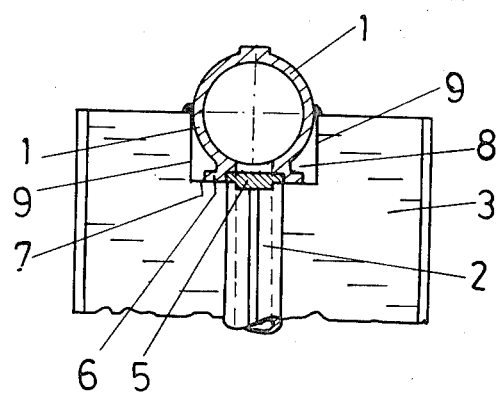
FIG. 3 shows a further embodiment.

The embodiment according to FIG. 3 shows a recess 8 of reduced depth so that the header is welded to the adjacent edges 9 of the ribs 3 approximately at the height of its center plane. The welding can naturally also be carried out at the bottom edges 7 of the recess 8 of the ribs 3. In this case it may be of advantage to slightly bevel the lateral edges 9 of the recess 8 in order to make the radially projecting ridges of the header more easily accessible.

The required welding joints are preferably made by means of shielded arc welding.

It is also practicable to produce the required compressive force by soldering spots.

It is obvious that the production of the tube joint according to invention is neither material- nor time consuming and that its costs of production can thus be kept low obtaining optimum tightness and muffling of noises at the same time.

What is claimed is:

1. A tube joint between two intersecting tubes of a light metal radiator comprising a first tube having at least two ribs extending in a longitudinal direction thereof and projecting from both sides thereof, a second tube being a header transversely extending with respect to the ribs of said first tube, one end of said first tube communicating with an aperture in the surface of said second tube, a washer provided between said one end of said first tube and said aperture of said second tube, and a spot weld arranged between said second tube and each of said ribs of said first tube, said second tube being pressed and held against said first tube by means of said spot welds.

2. A tube joint according to claim 1, wherein said first tube ends at a distance below the end portions of its ribs, said second tube at least partially engaging the thus formed recess and being spot-welded to the edges of said ribs.

3. A tube joint between two intersecting tubes of a light metal radiator comprising a first tube having at least two ribs extending in a longitudinal direction and projecting on both sides thereof, a second tube being a header transversely extending with respect to the ribs of said first tube, one end of said first tube communicating with an aperture in the surface of said second tube, a washer being provided between said one end and said aperture, said second tube having two ridges projecting therefrom in the intersecting area of the two tubes and on both sides of said one end of said first tube, said ridges of said second tube have radial indentations, said ribs of said first tube being inserted into said radial indentations of said ridges of said second tube and welded thereto, whereby said second tube is pressed and held against said first tube.

4. A tube joint according to claim 3, wherein said first tube is pressed against stop zones provided on said second tube, said washer being elastically deformed by a pre-set dimension and between said stop zones.

5. A tube joint according to claim 4, wherein the bottom surfaces of said radial indentations in said ridges of said second tube are stop zones for said ribs of said first tube.

6. A tube joint according to claim 3, wherein the welds are spot-welds and the light metal is aluminum.

* * * * *